(12) United States Patent
Lim et al.

(10) Patent No.: US 8,339,730 B2
(45) Date of Patent: Dec. 25, 2012

(54) TWO-STEP RECESS BASE

(75) Inventors: Hong-taek Lim, Suwon-si (KR);
Yong-han Song, Yongin-si (KR);
Sung-wook Kim, Suwon-si (KR)

(73) Assignee: Seagate Technology International

( * ) Notice: Subject to any disclaimer, the term of this patent is extended or adjusted under 35 U.S.C. 154(b) by 35 days.

(21) Appl. No.: 12/908,556

(22) Filed: Oct. 20, 2010

(65) Prior Publication Data

US 2011/0194212 A1    Aug. 11, 2011

(30) Foreign Application Priority Data

Feb. 5, 2010    (KR) .................. 10-2010-0011184

(51) Int. Cl.
*G11B 33/14* (2006.01)
(52) U.S. Cl. ..................................... 360/97.01
(58) Field of Classification Search ............. 360/97.01
See application file for complete search history.

(56) References Cited

U.S. PATENT DOCUMENTS

| | | | |
|---|---|---|---|
| 7,307,811 B2 * | 12/2007 | Xu et al. ........... | 360/97.01 |
| 7,379,265 B2 * | 5/2008 | Wang et al. ........ | 360/97.02 |
| 7,535,671 B2 * | 5/2009 | Suzuki et al. ...... | 360/97.02 |
| 7,573,671 B2 * | 8/2009 | Serizawa et al. ... | 360/97.02 |
| 7,751,145 B1 * | 7/2010 | Lin et al. ........... | 360/97.02 |
| 7,898,764 B2 * | 3/2011 | Chan et al. ........ | 360/97.02 |
| 8,009,384 B1 * | 8/2011 | Little ................ | 360/97.02 |
| 8,059,364 B1 * | 11/2011 | Andrikowich et al. .... | 360/97.02 |

FOREIGN PATENT DOCUMENTS

| | | |
|---|---|---|
| JP | 11-232866 | 8/1999 |
| KR | 20030031841 | 4/2003 |
| KR | 20030068261 | 8/2003 |
| KR | 10-0450673 | 9/2004 |

* cited by examiner

Primary Examiner — Mark Blouin

(57) ABSTRACT

A base member including two-step recesses and a hard disk drive (HDD) including the same. The HDD includes a base member; a spindle motor installed in the base member; a data storage disk assembled to the spindle motor; and an actuator rotatably installed in the base member and for moving a read/write head to a desired position on the disk, wherein the base member includes: a first floor surface disposed in a region facing the disk and having a center portion in which the spindle motor is installed; a shroud formed on a circumference of the first floor surface and extending the exterior circumference of the disk; and two-step recesses formed in an operating region of the actuator, wherein the two-step recesses comprise a first step recess formed on the first floor surface and a second step recess formed on a floor surface of the first step recess. An extended shroud is formed in an upstream side of an operating region of the actuator of the base member, protrudes from the shroud, and extends along the exterior circumference of the disk. An air block is installed in a downstream side of the operating region of the actuator.

17 Claims, 6 Drawing Sheets

TWO-STEP RECESS BASE

CROSS-REFERENCE TO RELATED APPLICATIONS

This application claims the benefit of Korean Patent Application No. 10-2010-0011184, filed on Feb. 5, 2010, in the Korean Intellectual Property Office, the disclosure of which is incorporated herein in its entirety by reference.

BACKGROUND

1. Field of the Invention

The inventive concept relates to a hard disk drive, and more particularly, to a base member that supports a spindle motor and an actuator and a hard disk drive including the base member.

2. Description of the Related Art

Hard disk drives (HDDs) which are one of information storage devices are used to record data on a disk or reproduce data from the disk using a read/write head. In the HDDs, the read/write head performs a read/write operation while moving to a desired position by an actuator in a state of flying above from a recording surface of a rotating disk at a predetermined height.

In the conventional HDDs, a data storage disk is assembled to a spindle motor and rotates. Such a rotation of the data storage disk generates an air flow in a HDD. The air flow vibrates the HDD and affects the read/write head installed in an actuator, which causes a position error signal (PES).

An HDD has employed a plurality of disks to store high capacity data. However, an amount of data storage for a single disk considerably increases and thus a HDD capable of storing high capacity data and employing a single disk has been released. This means an increase in an empty space of the HDD. Thus, the HDD that employs a single disk may change a design of a base member in order to improve the characteristic of an air flow near the actuator.

SUMMARY

The inventive concept provides a base member including two-step recesses and a hard disk drive including the base member in order to improve the characteristics of an air flow near an actuator.

According to an aspect of the inventive concept, there is provided a base member of a hard disk drive (HDD) that supports a spindle motor assembled to a data storage disk, and an actuator for moving a read/write head to a desired position on the disk, the base member including: a first floor surface disposed in a region facing the disk and having a center portion in which the spindle motor is installed; a shroud formed on a circumference of the first floor surface and extending the exterior circumference of the disk; and two-step recesses formed in an operating region of the actuator, wherein the two-step recesses comprise a first step recess formed on the first floor surface and a second step recess formed on a floor surface of the first step recess.

Side surfaces of the first step recess and the second step recess may be inclined.

The base member of the HDD may further include: a second floor surface in which an actuator pivot for rotatably supporting the actuator is installed, and being on the same plane as a floor surface of the second step recess.

An extended shroud may be formed in an upstream side of an operating region of the actuator, protrude from the shroud, and extend along the exterior circumference of the disk. The extended shroud may extend to a start point of an upstream side surface of the first step recess.

An air block may be installed in a downstream side of the operating region of the actuator. The air block may be installed in a position corresponding to a downstream side surface of the second step recess and a floor surface of the first recess connected to the downstream side surface of the second step recess. The air block may be spaced apart from the exterior circumference of the disk by 2.5 and 3.5 mm.

According to another aspect of the inventive concept, there is provided a HDD including: a base member; a spindle motor installed in the base member; a data storage disk assembled to the spindle motor; and an actuator rotatably installed in the base member and for moving a read/write head to a desired position on the disk, The actuator may include: an actuator arm disposed to operate below the disk; a head gimbal assembly installed at the leading end portion of the actuator arm and supporting a slider on which the read/write head is mounted to be elastically biased toward a lower surface of the disk; and a voice coil motor (VCM) for rotating the actuator arm.

The actuator may include: a lower actuator arm disposed to operate below the disk; an upper actuator arm disposed to operate above the disk; head gimbal assemblies installed at respective leading end portions of the lower actuator arm and the upper actuator arm and supporting sliders on which read/write heads are mounted to be elastically biased toward lower and upper surfaces of the disk; and a VCM for rotating the lower actuator arm and the upper actuator arm.

A disk damper may be disposed on the upper portion of the disk, is fixed to and supported by the base member, and have a shape facing a part of the upper surface of the disk.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
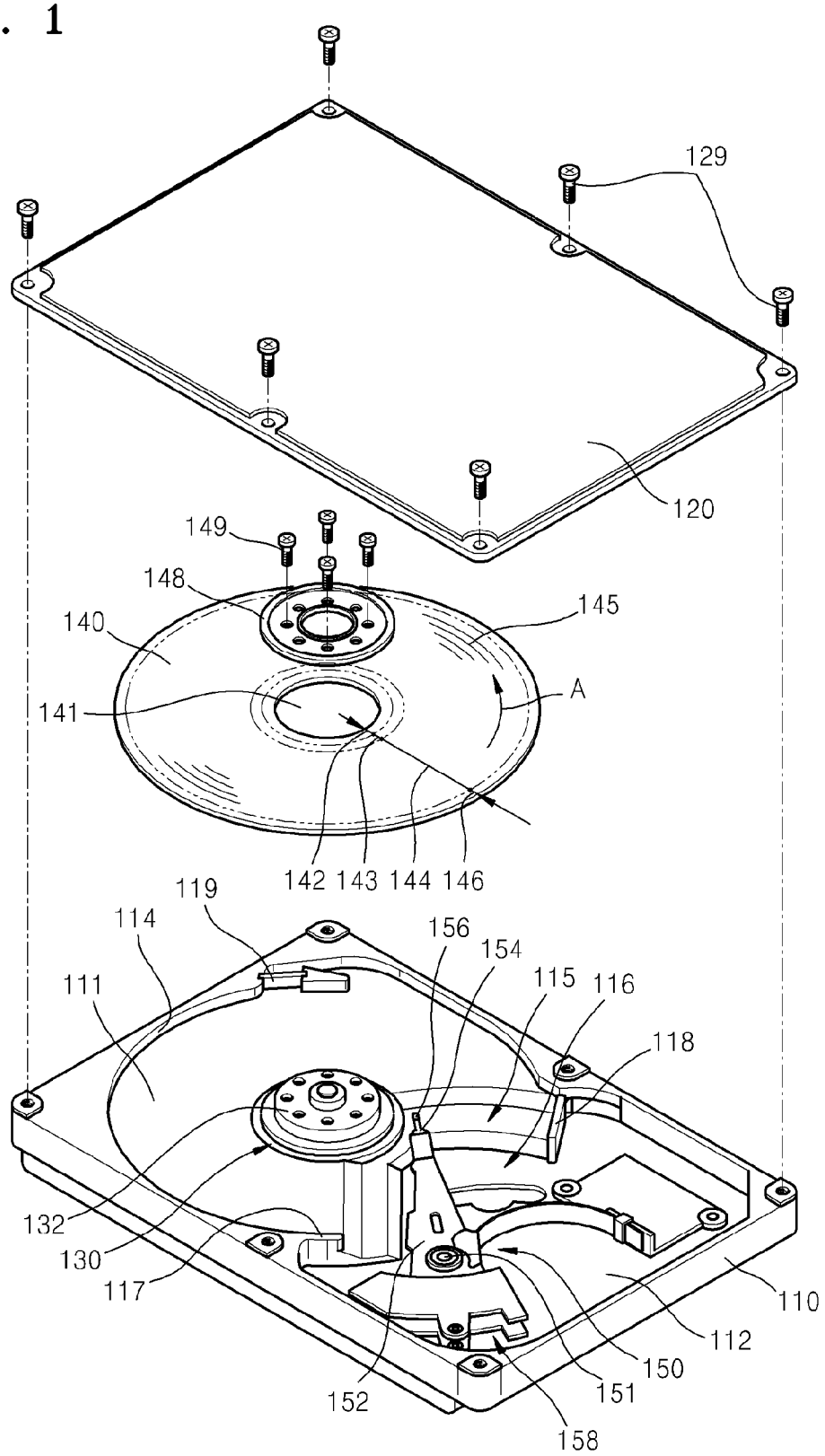
FIG. 1 is an exploded perspective view of a hard disk drive (HDD) according to an embodiment of the inventive concept.
Figure 2:
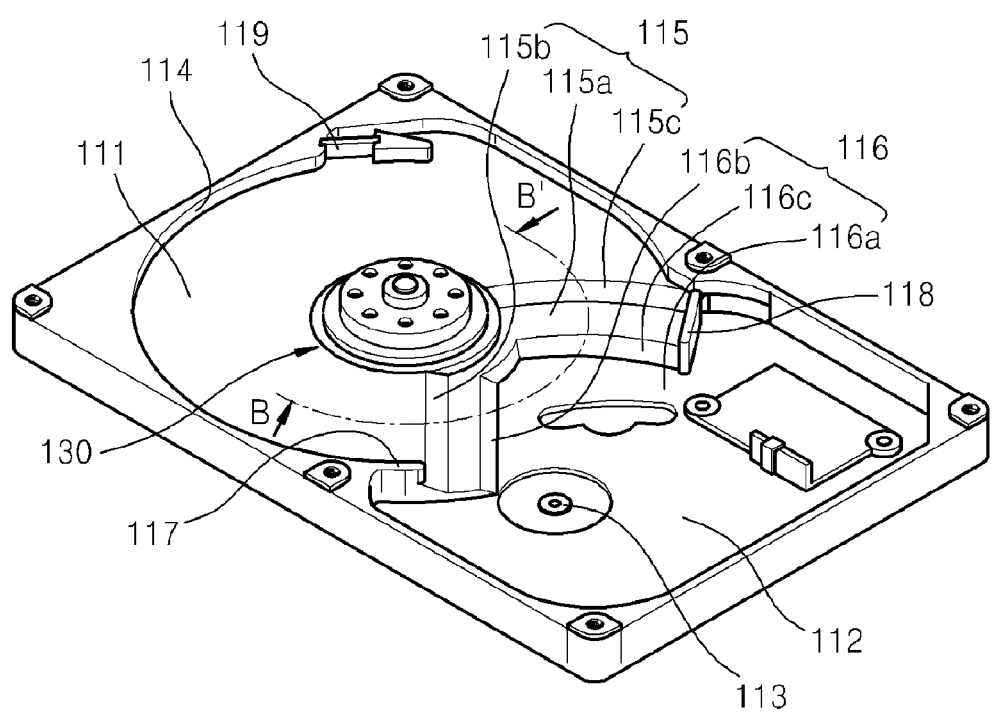
FIG. 2 is a perspective view of a base member of FIG. 1 according to an embodiment of the inventive concept.

FIG. 1 is an exploded perspective view of a hard disk drive (HDD) according to an embodiment of the inventive concept. FIG. 2 is a perspective view of a base member 110 of FIG. 1 according to an embodiment of the inventive concept.

Referring to FIGS. 1 and 2, the HDD includes the base member 110, a cover member 120, a spindle motor 130, a data storage disk 140 that is assembled to the spindle motor 130, and an actuator 150 that moves the spindle motor 130 and a read/write head for recording and reproducing data to a predetermined position on the disk 140.

The spindle motor 130 and the actuator 150 are installed on the base member 110. The cover member 120 is assembled to an upper portion of the base member 110 using a plurality of cover coupling screws 129 and wrap and protect the disk 140, the spindle motor 130, and the actuator 150.

The spindle motor 130 is installed on the base member 110. The disk 140 is combined with the spindle motor 130. A hollow 141 is formed in the center of the disk 140, and a hub 132 of the spindle motor 130 is inserted into the hollow 141, and thus the spindle motor 130 and the disk 140 are assembled. A disk clamp 148 is used to firmly fix the disk 140 to the spindle motor 130. The disk clamp 148 is combined to an upper end portion of the spindle motor 130, for example, an upper end portion of the hub 132, using a plurality of clamp coupling screws 149, presses the disk 140, and thus the disk 140 is firmly fixed to the hub 132 of the spindle motor 130.

A clamping region 142 in which the disk clamp 148 contacts the circumference of the hollow 141 is disposed in the disk 140. A parking region 143 in which a slider 156 that will be described later is parked is disposed in the circumference of the clamping region 142. A non-record region 146 in which data is not recorded is disposed along the exterior circumferential edge of the disk 140. A record region 144 in which data is recorded is disposed between the parking region 143 and the non-record region 146. A plurality of tracks 145 in which data is recorded is disposed in the record region 144 of the disk 140.

The actuator 150 includes an actuator arm 142 rotatably combined to an actuator pivot 151 installed in the base member 110, a head gimbal assembly 154 installed at the leading end portion of the actuator arm 152 and supporting the slider 156 on which the read/write head is mounted to be elastically biased toward a surface of the disk 140, and a voice coil motor (VCM) 158 rotating the actuator arm 152.

The VCM 158 provides a driving force for rotating the actuator arm 152, is controlled by a servo control system, and rotates the actuator arm 152 in a direction following the Fleming's left hand rule by the interaction between current input into a VCM coil and a magnetic field formed by a magnet. In detail, if the power of the HDD is turned on, and the disk 140 starts to rotate, the VCM 158 rotates the actuator arm 152 clockwise so that the slider 156 on which the read/write head is mounted moves from the parking region 143 of the disk 140 to the record region 144. In contrast, if the power of the HDD is turned off and the disk 140 stops rotating, the VCM 158 rotates the actuator arm 152 counterclockwise so that the slider 156 moves from the record region 144 of the disk 140. The slider 156 that moves from the record region 144 of the disk 140 may be parked in the parking region 143 disposed in the inner circumferential side of the disk 140. Meanwhile, the slider 156 may be parked in a ramp (not shown) installed in the outside of the exterior circumferential side of the disk 140.

As described above, the spindle motor 130 that is assembled with the disk 140 and the actuator 150 are installed on the base member 110. A filter 119 for filtering impurities contained in an air flow may be installed in one side corner of the base member 110. A first floor surface 111 is formed in a region of the base member 110 that faces the disk 140. A second floor surface 112 is formed in a region of the baser member 110 in which the actuator pivot 151 is installed. The spindle motor 130 is installed in a center portion of the first floor surface 111. A pivot support portion 113 for supporting the actuator pivot 151 is disposed on the second floor surface 112. The shroud 114 that extends along an exterior circumference of the disk 140 is formed on the circumference of the first floor surface 111 of the base member 110.

Two-step recesses 115 and 116 are formed in an operating region of the actuator 150 of the base member 110 by a predetermined depth from the first floor surface 111. In more detail, the first step recess 115 is formed from the first floor surface 111 by a predetermined depth, and the second step recess 116 is formed from a floor surface 115a of the first recess 115 by a predetermined depth. A floor surface 116a of the second step recess 116 may be on the same plane as the second floor surface 112 of the base member 110. Further, an upstream side surface 115b and a downstream side surface 115c of the first step recess 115 may be inclined. An upstream side surface 116b and a downstream side surface 116c of the second step recess 116 may form inclination surfaces. The dimension of first step recess 115 and the second step recess 116 will be described in detail later.

As described above, if the two-step recesses 115 and 116 are formed in an operating region of the actuator 150 of the base member 110, the characteristics of the air flow near the actuator 150 are improved like a reduction in the speed of the air flow, and thus a position error signal (PES) may be improved. This will be described in more detail later.

An extended shroud 117 that extends from the shroud 114 may be formed in an upstream side of the operating region of the actuator 150 of the base member 110, more specifically, an upstream side of the first step recess 115. The extended shroud 117 may protrude by a predetermined length from the shroud 114 along an external circumference of the disk 140, and extend to a start point of the side surface 115b of the upstream side of the first step recess 115.

An air block 118 may be formed in a downstream side of the operating region of the actuator 150 of the base member 110, more specifically, in a position corresponding to the downstream side surface 116c of the second step recess 116 and the floor surface 115a of the first recess 115 connected to the downstream side surface 116c. The air block 118 may extend in the exterior circumference of the disk 140 and be spaced apart from the exterior circumference of the disk 140 by a predetermined gap. The position and size of the air block 118 may be described in detail later.

As described above, the extended shroud 117 and the air block 118 disposed in the base member 110 may additionally improve the characteristics of the air flow near the actuator 150. This will be described in detail later.

Figure 3:
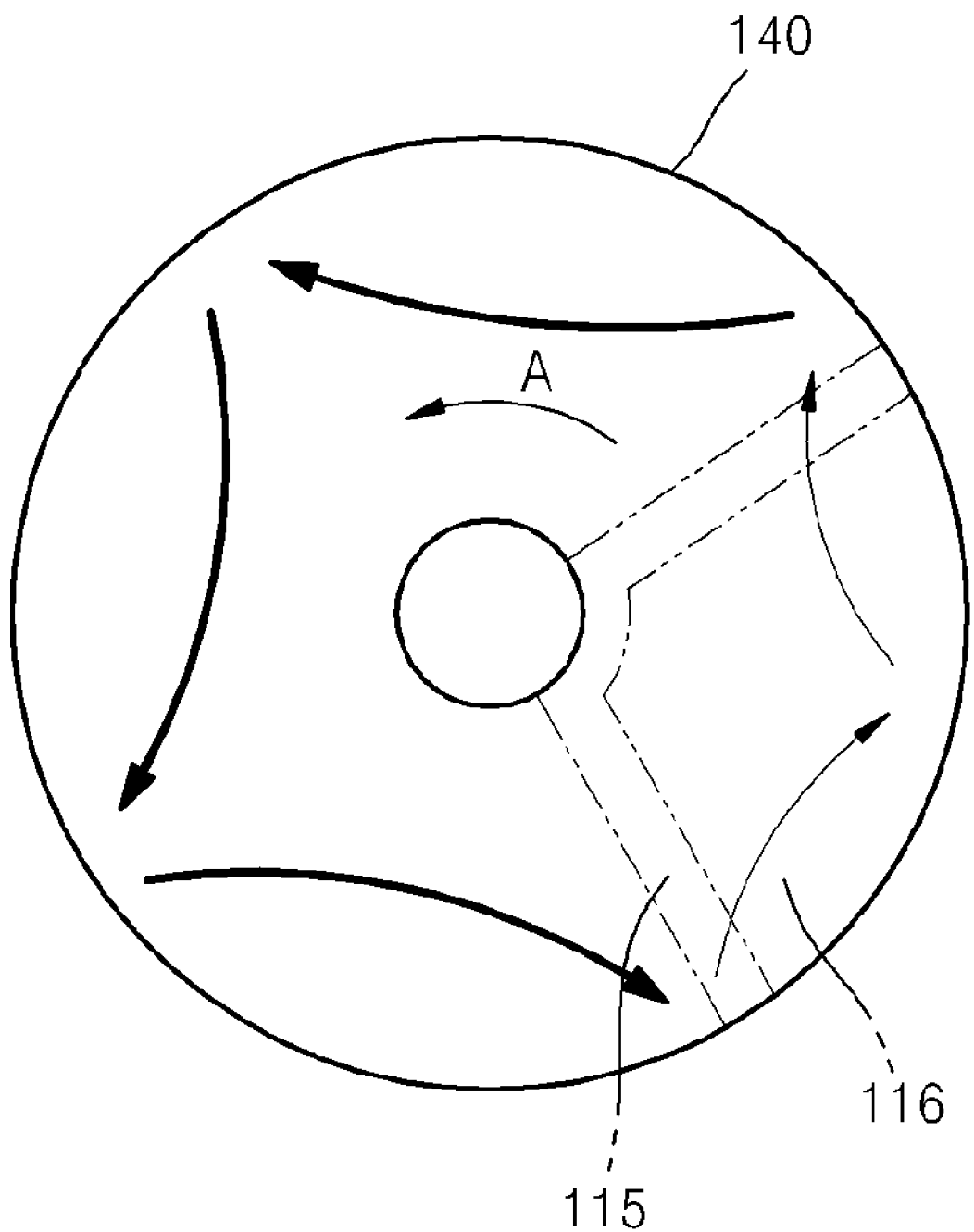
FIG. 3 is a schematic plan view of an air flow generated during the rotation of a disk according to an embodiment of the inventive concept.
Figure 4:
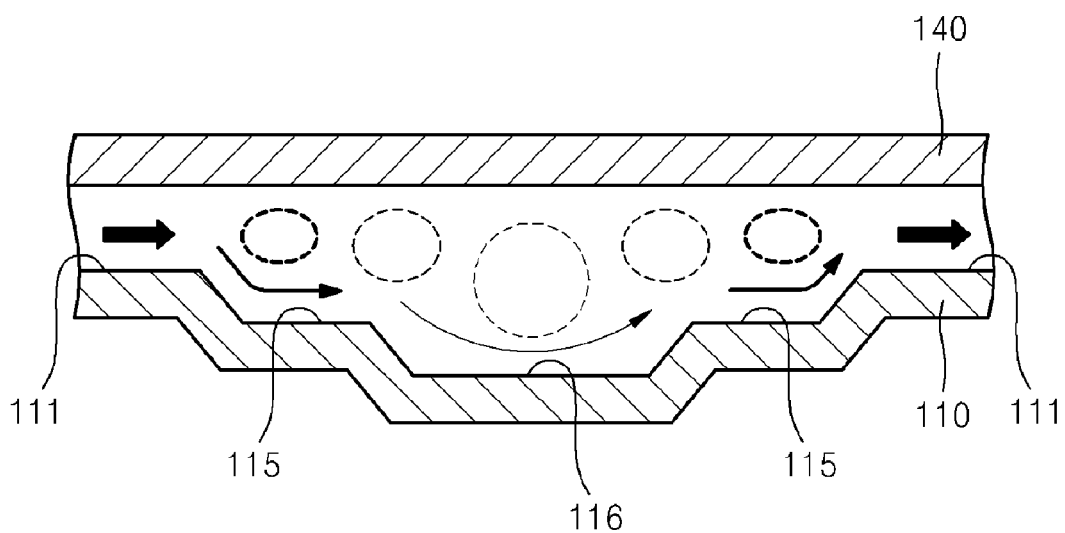
FIG. 4 is a cross-sectional view of the base member taken along a line B-B' of FIG. 2 and variations of the speed of an air flow generated by two-step recesses according to an embodiment of the inventive concept.

FIG. 3 is a schematic plan view of an air flow generated during the rotation of the disk 140 according to an embodiment of the inventive concept. FIG. 4 is a cross-sectional view of the base member 110 taken along a line B-B' of FIG. 2 and variations of the speed of an air flow generated by the two-step recesses 115 and 116 according to an embodiment of the inventive concept.

Referring to FIG. 3, if the disk 140 rotates in a direction of an arrow A, the air flow is generated in a circumferential direction of the disk 140 near the disk 140. If a recess is not formed in the base member 110, the air flow has the same speed at any positions in the circumferential direction of the disk 140. However, if the two-step recesses 115 and 116 are formed in the base member 110, the speed of the air flow is reduced in a region where the two-step recesses 115 and 116 are formed, i.e. in the operating region of the actuator 150. The reason for the reduction in the speed of the air flow in the region where the two-step recesses 115 and 116 are formed will be described with reference to FIG. 4.

Referring to FIG. 4, a space between the disk 140 and the base member 110 gradually increases from the first step recess 115 to the second step recess 116. The wider a sectional area of a passage of air, the slower the speed of the air flow according to a diffuser effect and thus the speed of the air flow is the slowest in the second step recess 116. To the contrary, the space between the disk 140 and the base member 110 is gradually reduced from the second step recess 116 to the first step recess 115. Thus, the speed of the air flow between the disk 140 and the base member 110 is gradually faster from the second step recess 116 to the first step recess 115 and between the first floor surface 111 and the disk 140 according to a nozzle effect. The two-step recesses 115 and 116 are formed in the base member 110, which prevents an abrupt change in a pressure and smoothly changes the speed of the air flow. Meanwhile, a vortex occurs near an external edge of the disk 140. The size of the vortex increases and the speed thereof is slower toward the first step recess 115 to the second step recess 116 since the space between the disk 140 and the base member 110 increases.

As described above, if the two-step recesses 115 and 116 are formed in the operating region of the actuator 150 of the base member 110, the speed of the air flow is smoothly reduced and the vortex is weakened, and thus influences of the air flow and the vortex on the actuator 152 and the disk 140 are reduced. The characteristics of the air flow near the actuator 150 are improved, and thus a PES generated by flowing air may be improved. The extended shroud 117 and the air block 118 reduce the occurrence and influence of the vortex near the exterior edge of the disk 140, and thus the PES may be additionally improved in an exterior edge region of the disk 140.

Figure 5:
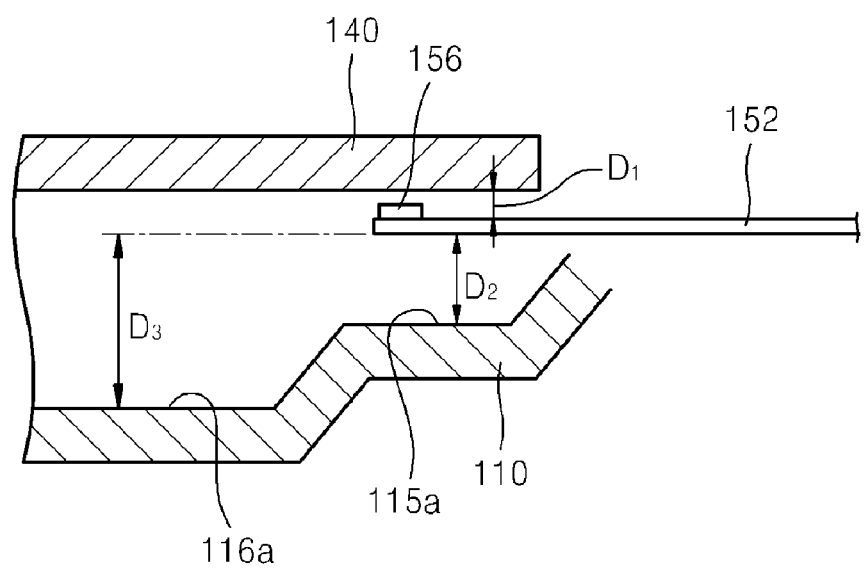
FIG. 5 is a cross-sectional view of gaps between an actuator arm, a disk, and two-step recesses according to an embodiment of the inventive concept.
Figure 6:
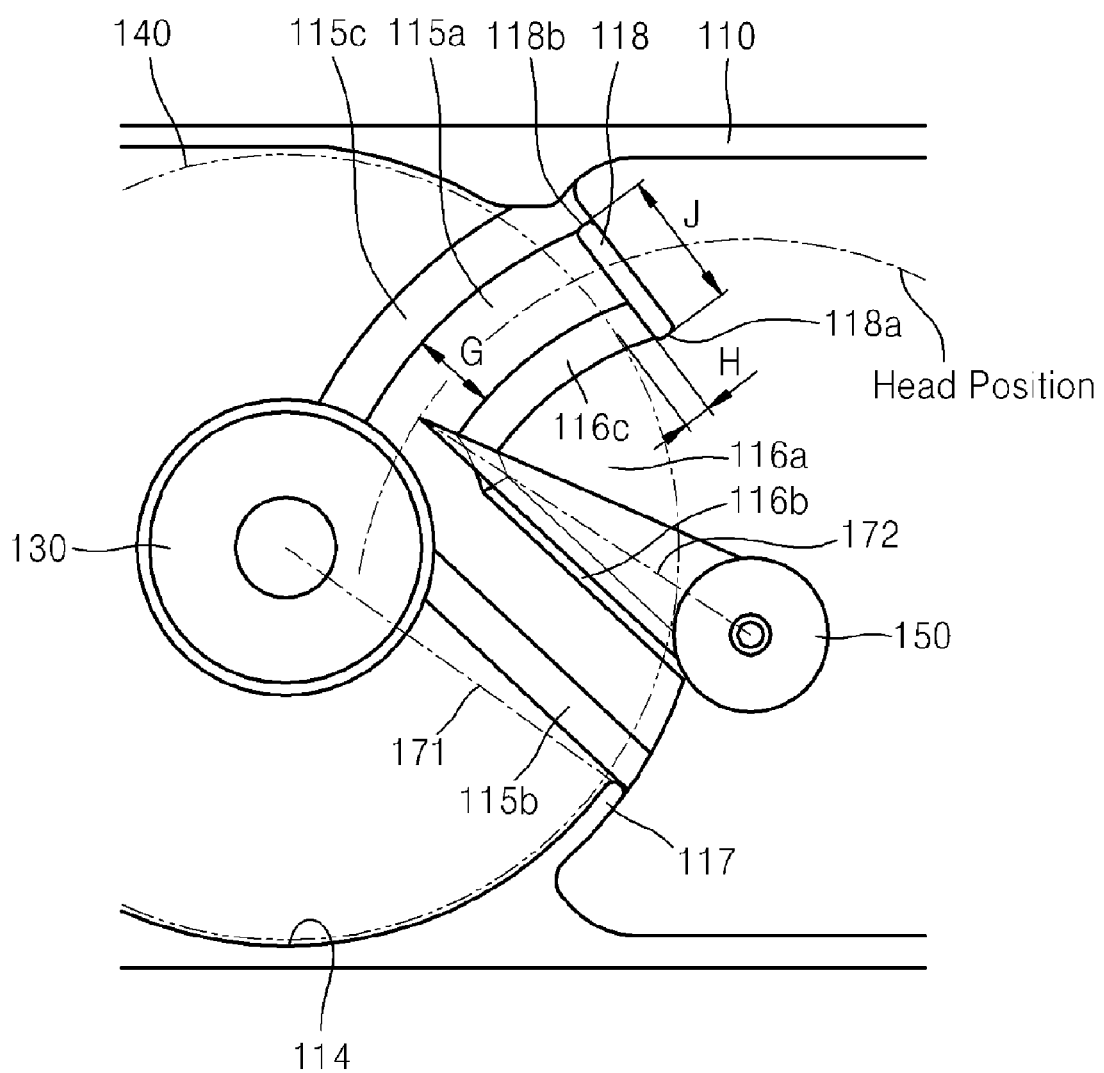
FIG. 6 is a top view of relative positions and sizes of a disk, an actuator, two-step recesses, an extended shroud, and an air block according to an embodiment of the inventive concept.

FIG. 5 is a cross-sectional view of gaps between the actuator arm 152, the disk 140, and the two-step recesses 115 and 116 according to an embodiment of the inventive concept. FIG. 6 is a top view of relative positions and sizes of the disk 140, the actuator 150, the two-step recesses 115 and 116, the extended shroud 117, and the air block 118 according to an embodiment of the inventive concept.

Referring to FIG. 5, a gap D1 between the disk 140 and the actuator arm 152 may be approximately between 0.8~0.9 mm, for example, in a HDD employing the disk 140 of 3.5 inches. A gap D2 between the actuator arm 152 and the floor surface 115a of the first step recess 115 is designed to be greater 3 times the gap D1. A gap D3 between the actuator arm 152 and the floor surface 116a of the second step recess 116 is designed to be greater 6 times the gap D1.

Referring to FIG. 6, in a HDD employing the disk 140 of 3.5 inches, as described above, the extended shroud 117 may extend to the start point of the side surface 115b of the upstream side of the first step recess 115. A line 171 that connects an end portion of the extended shroud 117 and a rotation center of the spindle motor 130 and a center line 172 in a length direction of the actuator arm 152 when a read/write head is positioned in the innermost side of the record region 144 of the disk 140 may be parallel to each other. A width G in a circumferential direction of the disk 140 of the floor surface 115a of the first step recess 115 may be greater than approximately 10 mm. The read/write head may be positioned in a center line of the floor surface 115a of the first step recess 115.

When a gap H between the air block 118 and an edge of the disk 140 is between 2.5~3.5 mm, a reduction effect of the PES may further increase in the exterior edge region of the disk 140. An upstream end portion 118a of the air block 118 may be identical to or be upper than an end point of the floor surface 116a of the second step recess 116. A downstream end portion 118b of the air block 118 may be identical to or be lower than an end point of the floor surface 115a of the first step recess 115. A length J of the air block 118 may be greater 1.5 times the width G in the circumferential direction of the disk 140 of the floor surface 115a of the first step recess 115.

A result of measuring a PES is listed in Table 1 below when the HDD including the base member 110 designed as above and employing the disk 140 of 3.5 inches operates.

TABLE 1

| Types  | Two-Step Recesses | Extended Shroud | Air Block | Average PES |
|--------|-------------------|-----------------|-----------|-------------|
| Case 1 | ○                 | X               | X         | 12.9        |
| Case 2 | ○                 | X               | ○         | 13.0        |
| Case 3 | ○                 | ○               | X         | 12.1        |
| Case 4 | ○                 | ○               | ○         | 10.85       |

An average PES is approximately 13 and 14 in a HDD including a conventional base member in which two-step recesses are not formed.

However, as listed in Table 1 above, all the average PES is below 13 in the cases 1 through 4 in which the two-step recesses 115 and 116 are informed in the base member 110. In particular, the average PES is 10.85 in the case 4 in which the second step recess 116, the extended shroud 117, and the air block 118 are formed in the base member 110, which shows that the PES is much improved.

Figure 7:
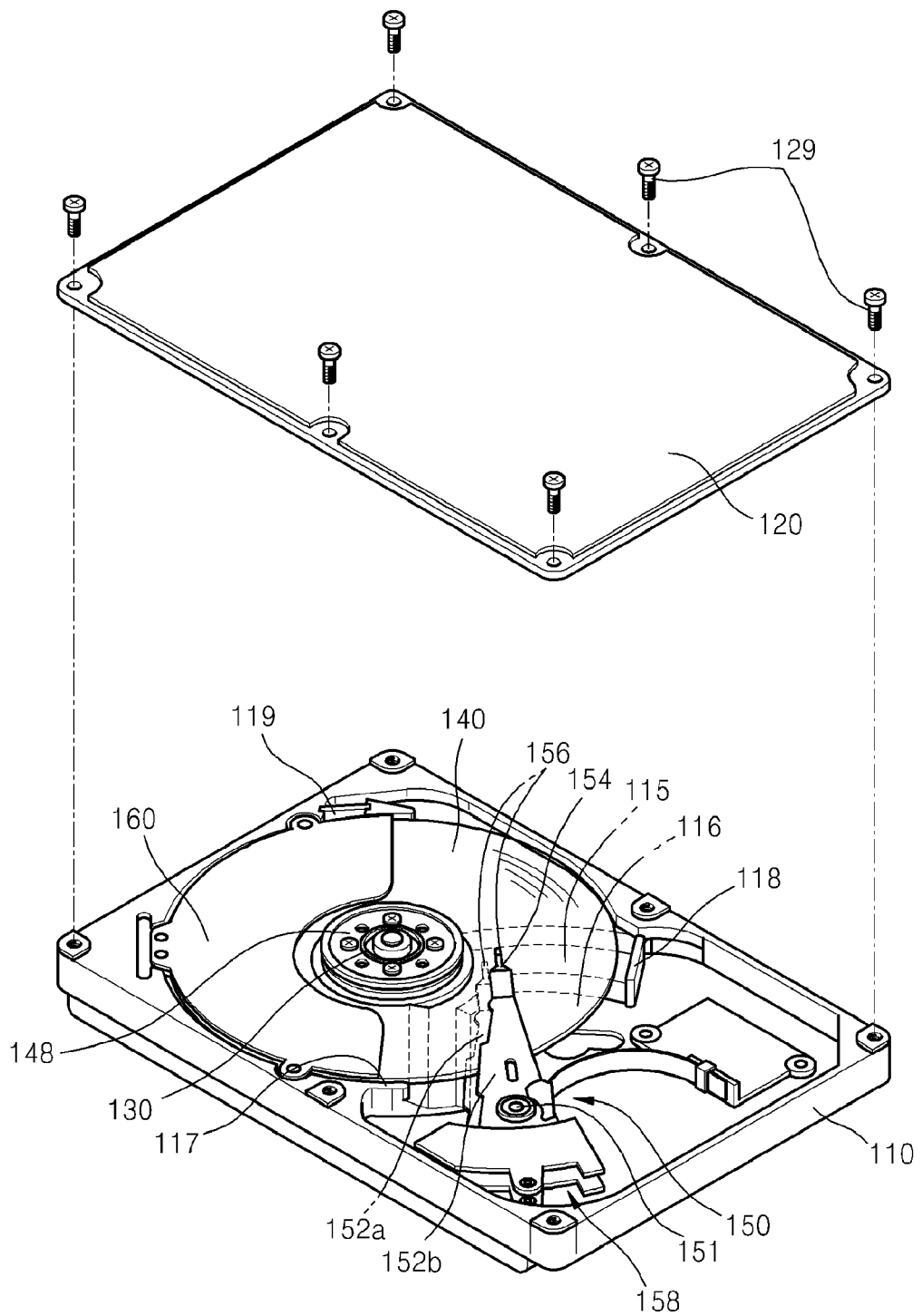
FIG. 7 is an exploded perspective view of a HDD according to another embodiment of the inventive concept.

FIG. 7 is an exploded perspective view of a HDD according to another embodiment of the inventive concept.

Referring to FIG. 7, the disk 140 is fixed to the spindle motor 130 of the HDD by the disk clamp 110. The actuator 150 includes two actuator arms 152a and 152b that are rotatably combined to the actuator pivot 151 installed in the base member 110. The head gimbal assembly 154 is combined to the leading end portion of each of the actuator arms 152a and 152b and supporting the slider 156 on which read/write heads are mounted to be elastically biased toward a surface of the disk 140. The lower actuator arm 152b is disposed below the disk 140. The read/write head that is combined to the lower actuator arm 152b records data onto a lower surface of the disk 140 or reads the recorded data. The upper actuator arm 152a is disposed above the disk 140. The read/write head that is combined to the upper actuator arm 152a records data onto an upper surface of the disk 140 or reads the recorded data.

The base member 110 shown in FIG. 2 may be applied to the HDD that employs the two actuator arms 152a and 152b and the two read/write heads and uses the lower and upper surfaces of the disk 140. In addition to the base member 110 of FIG. 7, the two-step recesses 115 and 116, the extended shroud 117, and the air block 118 may be formed in the HDD.

A disk damper 160 may be disposed in an upper portion of the disk 140 in order to reduce vibration of the disk 140 caused by an air flow. The disk damper 160 is fixed to and supported by the base member 110 and has a shape facing a part of the upper surface of the disk 140.

The disk damper 160 may also be applied to the HDD shown in FIG. 1.

While the inventive concept has been particularly shown and described with reference to exemplary embodiments thereof, it will be understood that various changes in form and details may be made therein without departing from the spirit and scope of the following claims.

What is claimed is:

1. An apparatus comprising:
   a base supporting a disk;
   a base floor surface disposed on the base in a region facing the disk;
   a first step recess disposed on the base floor surface and comprising a first step recess floor; and
   a second step recess disposed on the first step recess floor comprising a second step recess floor, wherein side surfaces of the first step recess and the second step recess are inclined.

2. The apparatus of claim 1, wherein the first step recess comprises an actuator pivot for rotatably supporting an actuator.

3. The apparatus of claim 1, further comprising:
   a first shroud disposed on a circumference of the base floor surface and extending along an exterior circumference of the disk;
   an actuator supported by the base; and
   an extended shroud disposed in an upstream side of an operating region of the actuator, wherein the extended shroud protrudes from the first shroud and extends along the exterior circumference of the disk.

4. The apparatus of claim 3, wherein the extended shroud extends to a start point of an upstream side surface of the first step recess.

5. The apparatus of claim 1, further comprising an air block disposed on the second step recess floor, wherein the air block is disposed in a downstream side of an operating region of an actuator supported by the base.

6. The apparatus of claim 1, further comprising an air block disposed on the second step recess floor, wherein the air block is disposed in a position corresponding to a downstream side surface of the second step recess and the first step recess floor connected to the downstream side surface of the second step recess.

7. The apparatus of claim 1, further comprising an air block disposed on the second step recess floor, wherein the air block is spaced apart from an exterior circumference of the disk by 2.5 and 3.5 mm.

8. An apparatus comprising:
   a base member supporting a data storage disk;
   a first floor surface disposed on the base in a region facing the disk;
   a first shroud disposed on a circumference of the first floor surface and extending along an exterior circumference of the disk; and
   two-step recesses comprising a first step recess disposed on the first floor surface and a second step recess disposed on a first step floor surface of the first step recess, wherein side surfaces of the first step recess and the second step recess are inclined.

9. The apparatus of claim 8, wherein the base member further comprises a second floor surface comprising an actuator pivot for rotatably supporting an actuator, wherein the second floor surface is on the same plane as the second step floor surface of the second step recess.

10. The apparatus of claim 8, further comprising:
    an actuator supported by the base member; and
    an extended shroud disposed in an upstream side of an operating region of the actuator of the base member, wherein the extended shroud protrudes from the first shroud and extends along the exterior circumference of the disk.

11. The apparatus of claim 10, wherein the extended shroud extends to a start point of an upstream side surface of the first step recess.

12. The apparatus of claim 8, further comprising an air block disposed in a second step floor surface of the second step recess, wherein the air block is disposed in a downstream side of an operating region of an actuator supported by the base member.

13. The apparatus of claim 8, further comprising an air block disposed in a second step floor surface of the second step recess, wherein the air block is disposed in a position corresponding to a downstream side surface of the second step recess and first step floor surface of the first step recess connected to the downstream side surface of the second step recess.

14. The apparatus of claim 8, further comprising an air block disposed in a second step floor surface of the second step recess, wherein the air block is spaced apart from the exterior circumference of the disk by 2.5 and 3.5 mm.

15. The apparatus of claim 8, further comprising an actuator supported by the base member, wherein the actuator comprises:
    an actuator arm operable to operate below the disk;
    a head gimbal assembly disposed on a leading end portion of the actuator arm and supporting a read/write head, wherein the head is elastically biased toward a lower surface of the disk; and
    a voice coil motor operable to rotate the actuator arm.

16. The apparatus of claim 8, further comprising an actuator supported by the base member, wherein the actuator comprises:
    a lower actuator arm disposed to operate below the disk;
    an upper actuator arm disposed to operate above the disk;
    head gimbal assemblies disposed on leading end portions of the lower actuator arm and the upper actuator arm, wherein the head gimbal assemblies support read/write heads and are operable to elastically bias the read/write heads toward lower and upper surfaces of the disk; and
    a voice coil motor operable to rotate the lower actuator arm and the upper actuator arm.

17. The apparatus of claim 8, further comprising a disk damper disposed on an upper portion of the disk and supported by the base member.

* * * * *